No. 769,484. Patented September 6, 1904.

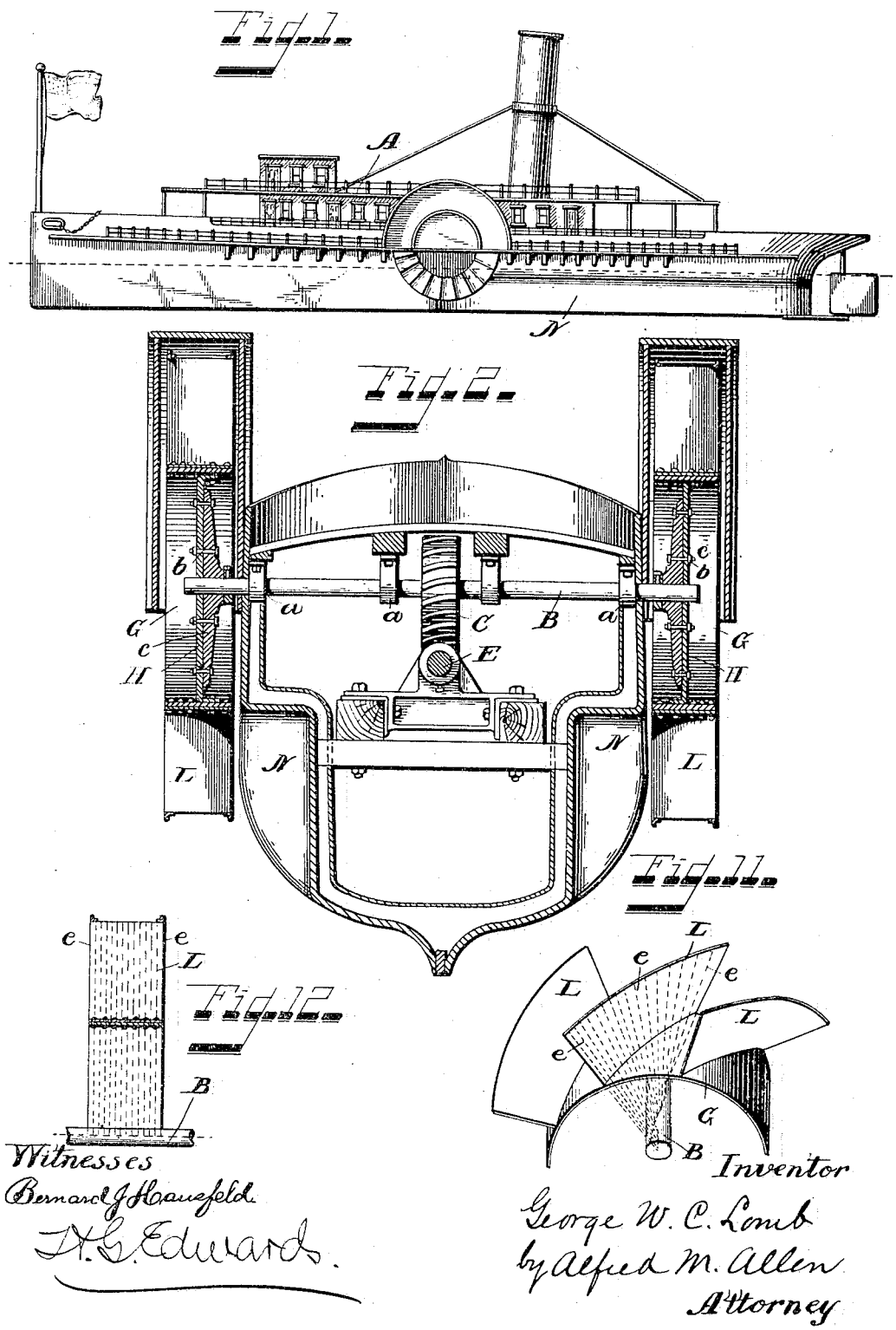

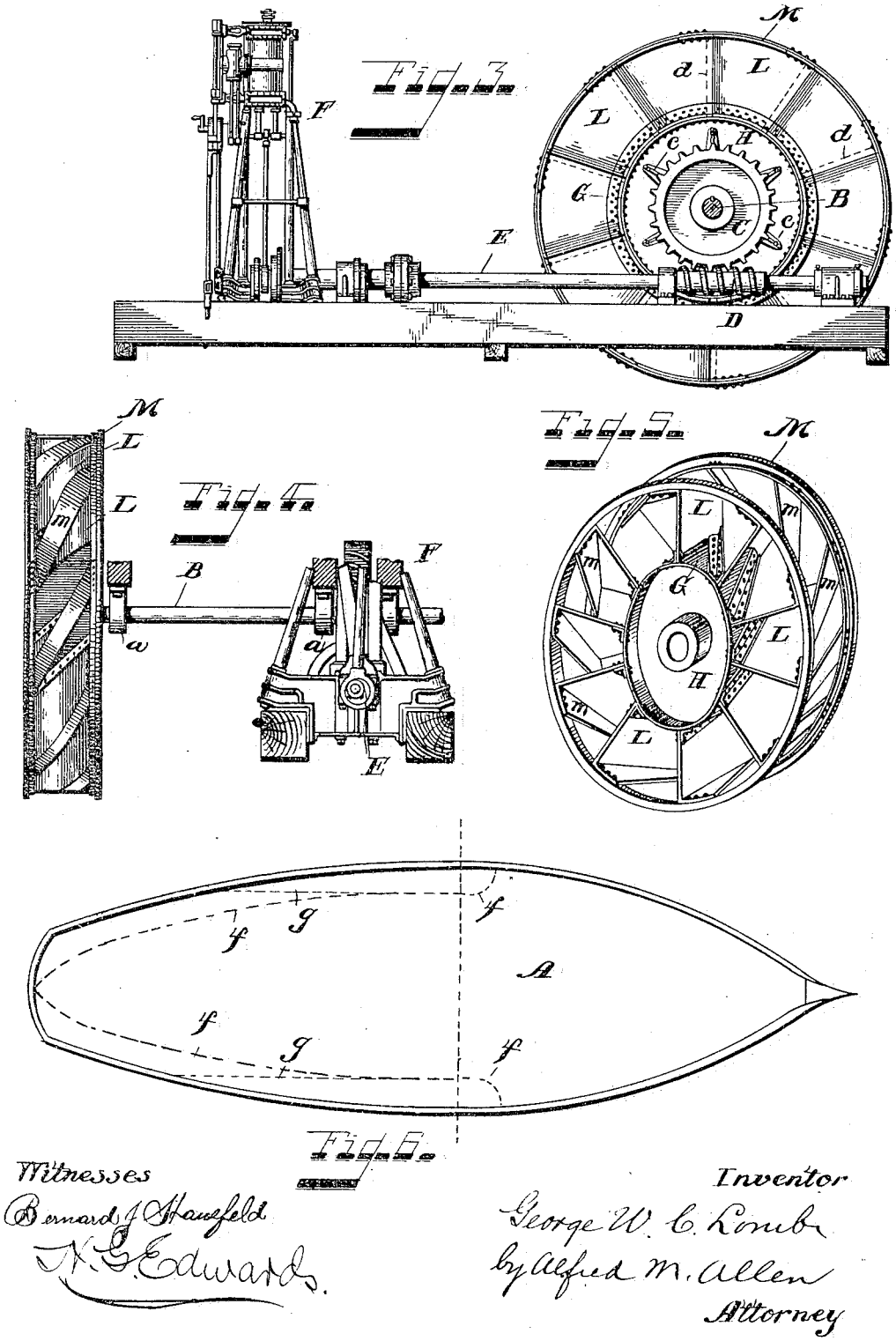

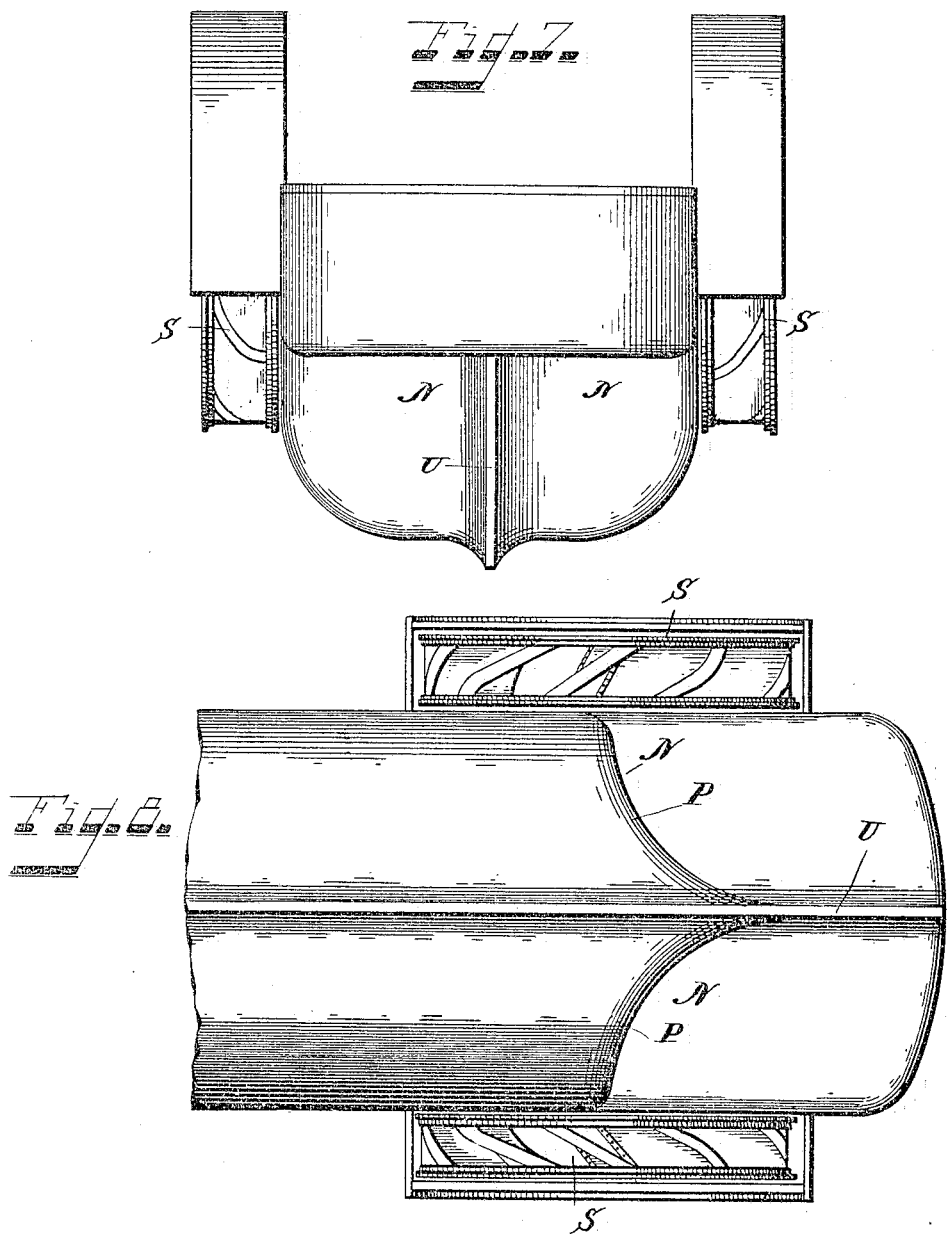

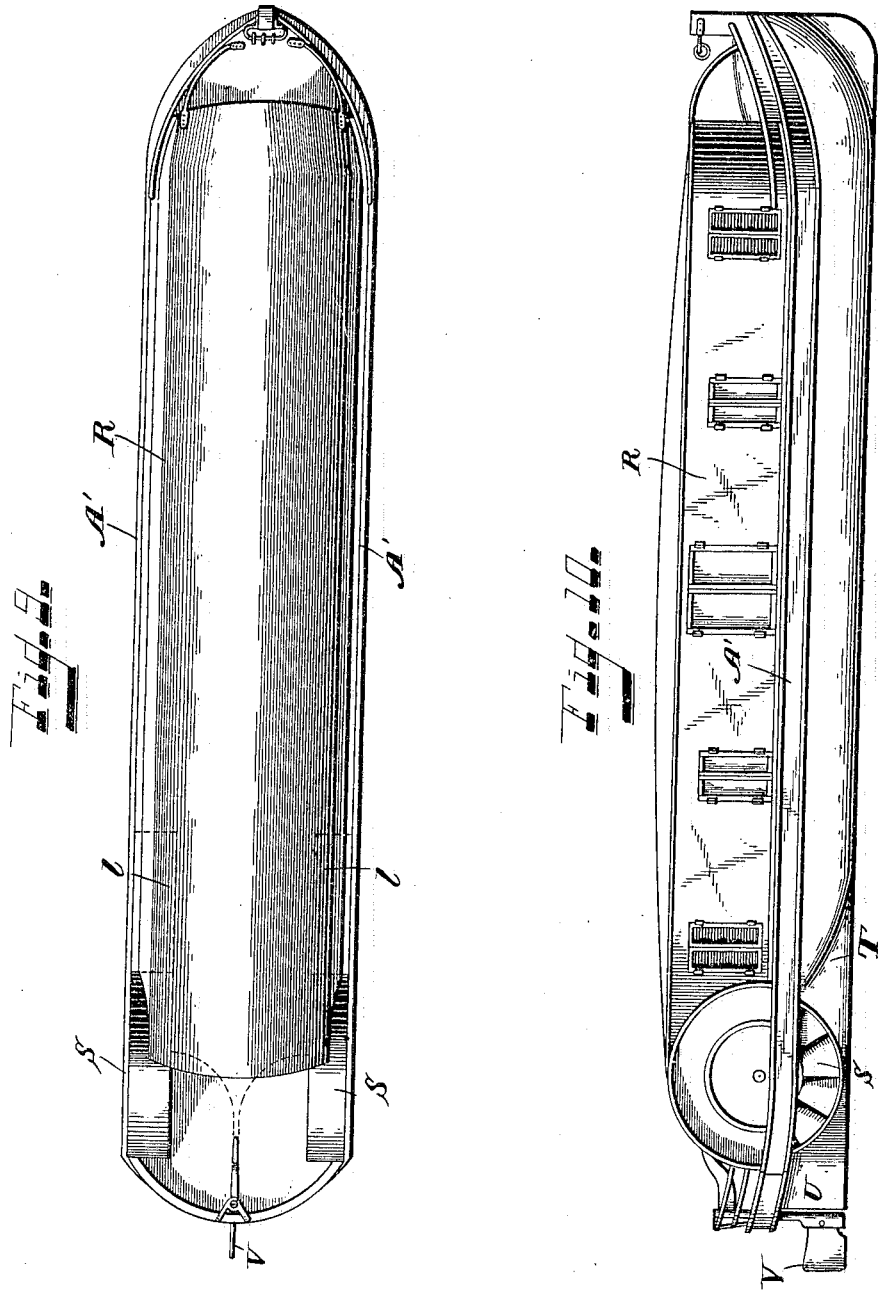

UNITED STATES PATENT OFFICE.

GEORGE W. C. LOMB, OF BIRMINGHAM, ALABAMA, ASSIGNOR TO THE INTER-OCEAN TRANSIT COMPANY, OF CINCINNATI, OHIO, A CORPORATION OF OHIO.

BOAT.

SPECIFICATION forming part of Letters Patent No. 769,484, dated September 6, 1904.

Application filed January 23, 1899. Serial No. 703,069. (No model.)

*To all whom it may concern:*

Be it known that I, GEORGE W. C. LOMB, a citizen of the United States, residing at Birmingham, county of Jefferson, State of Alabama, have invented certain new and useful Improvements in Boats, of which the following is a full, clear, and exact description, reference being had to the accompanying drawings, forming part of this specification.

My invention relates to means for propelling boats on rivers, lakes, oceans, canals, or other bodies of water, and has special relation to what may be called "paddle-wheel" propulsion in connection with certain novel arrangements of the lines of the boat to coöperate therewith, whereby great speed and power may be developed.

In the ordinary construction of paddle-wheels the paddles are set at right angles to the center line of the boat, and consequently they strike and leave the water in an almost horizontal position. The power of the paddle for propelling the boat is thus lost almost entirely as it enters the water, and as it leaves the water a large amount of power is lost in raising and carrying up with it a considerable volume of water. The ordinary paddle-wheel can therefore only be employed at a loss of a great amount of power, and the speed of the boat soon reaches its maximum. In addition to this the action of the paddle-wheels create in themselves such a disturbance of the water as to cause great waves to follow the boat, so that on rivers and the like unless the speed of the boat is cut down while passing other vessels tied up to the banks they are frequently washed from their moorings, while in canals and the like such damage is afflicted on the banks that power-propulsion of canal-boats has heretofore been uniformly a failure, except where the banks are so constructed that the wash of the waves cannot affect them.

The first part of my invention relates, therefore, to the construction of the paddle-wheels with the paddle set at such an angle to the line of propulsion that the least power possible will be lost or expended uselessly as the paddles enter and leave the water.

The second part of my invention relates to the shape of the boat at the side of the paddle-wheels, whereby the movement of the water caused by the action of the wheels may be in itself utilized to assist in propelling the vessel and whereby also the vacancy in the water left by the boat as it moves through the water may be filled with the water moved by the wheels instead of allowing the surrounding water to rush in and fill the vacancy, and thus give rise to a great wave to follow the boat, and whereby the action of the paddle-wheels will thus be given full effect without such disturbance as to wash the banks of narrow channels or canals or unship from their moorings vessels tied to the banks.

In the drawings, Figure 1 is a side elevation of one of my boats with paddle-wheels at or near the center of the boat. Fig. 2 is a cross-section of the boat shown in Fig. 1, taken through the paddle-wheels. Fig. 3 is a side elevation of one paddle-wheel and the marine engine for driving the wheels. Fig. 4 is a front elevation of same, parts of the engine being cut away and the supporting-timbers in cross-section. Fig. 5 is a perspective view of one of the paddle-wheels. Fig. 6 is a plan view showing the lines of the boat. Fig. 7 is a rear view of a canal-boat construction, showing my wheels in place. Fig. 8 is a bottom plan view of same. Fig. 9 is a top plan view of a canal-boat with the wheels set within the lines of the boat. Fig. 10 is a side view of same. Fig. 11 is a diagrammatic view in perspective of a portion of the paddle-wheel, showing the shape of the paddles. Fig. 12 is a front elevation of same.

My paddle-wheels can be applied to any construction of boat, and I have chosen to illustrate the invention, first, in connection with a side-wheel boat of the construction for lake or river use, and, second, in connection with a boat such as would be suitable for canal purposes. A represents such a lake or river boat, a side view being shown in Fig. 1 and a plan of the shape being shown in Fig. 6.

B is a shaft extending horizontally across the boat and journaled in suitable boxes *a a* and upon which the paddle-wheels are mounted. For driving the wheel-shaft I prefer to mount a worm-gear C on the middle of the shaft, with which the screw D meshes, mounted on the engine-shaft E, which is driven by any suitable marine engine F, either gas, gasolene, electricity, or steam and of any suitable and convenient construction. Of course it will be understood that the character of the marine engine in no way enters into my invention and that the method of driving the paddle-wheel shaft by worm or screw is only one of the many ways by which the shaft can be driven, although, as I have said, I believe this method a preferable one.

The paddle-wheel consists of a cylinder or drum G, provided with a central partition H, secured by bolts $b\ b$ to spider-arms $c\ c$, which arms unite at the center and are keyed to the paddle-wheel shaft B. Upon the outside surface of the cylinder or drum G the paddles L L are securely riveted.

Heretofore in the construction of propelling-blades it has been customary to provide spiral blades of either constant or variable pitch, and by this I mean blades having a spiral surface generated by a line or generatrix advancing along and rotating around the axis of the cylinder or shaft upon which the blades are mounted. While the blades of my paddles are, strictly speaking, spiral blades, they are not spiral with relation to the axis of the supporting-shaft. The directrix instead of being the axis of the supporting-shaft is a line at right angles to this axis, and the blade itself is a portion of a double spiral of constant pitch generated on a radial line of two concentric cylinders midway between the ends of the cylinders and contained between the surfaces of the cylinders and planes at right angles thereto. In the construction illustrated there are ten of these paddles set at such an angle across the face of the drum that when viewed from the side the rear edge of one paddle overlaps the front edge of the next paddle about one inch, as shown by the dotted lines $d\ d$ in Fig. 3. The lines of attachment across the face of the drum G are perfectly straight from outer to inner edge, and the paddles themselves are bent so that straight lines drawn from the wheel-shaft to the paddle will all lie on the plane of the paddle.

As shown in Figs. 11 and 12, if equidistant points are taken on the outer edge of the paddle and straight lines $e\ e$ are projected to the center of the shaft the paddle is so bent that the two outside lines will form the rear and forward edges of the paddle, and all the intermediate lines will lie wholly within the plane of the paddle and will strike the center lines of the shaft at equidistant points. Moreover, when viewed in elevation, as shown in Fig. 12, these lines will lie in parallel planes. In other words, there is no flare to the paddles, and when measured on a line parallel to the center line of the shaft they are of the same width at the outer edge as where secured to the drum. Each of the paddles is also preferably provided with an outer flange $m\ m$, bent over at right angles to the face of the paddle, but taking the curve of a cylinder concentric with the drum G. Then to bind the paddle together an inner and outer rim M M is securely riveted to the flanges at each edge. In this construction of paddle-wheel, however, it will be borne in mind that the essential feature is the shape of the paddles or blades with reference to the cylinder upon which they are mounted. The diameter and width or length of the drum, the width or length of the paddles, the flanges, and the rim are all matters of detail of construction and can and must be varied to suit the requirements of any particular boat. The essential principle of construction is that the paddles are not merely flat plates set at an angle to the shaft, nor are the paddles given a spiral or screw twist with reference to the axis of the shaft upon which they are mounted, but they are so bent that all the straight radial lines from center of shaft to the paddle will remain in the plane of same, no matter what its length or breadth. The benefits arising from this novel construction are that I am enabled to use a paddle of the same width throughout, and consequently I can utilize every inch of the paddle in the stroke, a result impossible to obtain with the ordinary spiral or screw blade generated with the axis of the supporting-shaft as a directrix, because the radial lines in the ordinary screw-blade all running to center the inner end of the blade must be narrower than at the outer end; nor is it possible to use straight blades or paddles merely set at an angle to the line of propulsion, for in that event the side lines of the straight blades being radial lines the edges of succeeding blades cannot be parallel, and such blades must leave open spaces at the outer end, or they must overlap so much at their inner ends as to swamp the wheel when in use. The only way to obtain the full propelling power of the paddles when set at an angle around the shaft is to use sections of spiral blades formed as above described, so as to keep the paddle of the same width at top and bottom with the side lines parallel. Another point of importance to be noticed also is that with my construction of paddle the angle of the blade at its inner end with the center line of the wheel-shaft will be much less than at its outer end, and as a result the tendency, in addition to the centrifugal force, as the wheel is rotated, will be to throw the water from the center outward, and as the most power of the paddle-stroke is at the periphery of the wheel the full power of the wheel is utilized. It will further be seen that with the blades adjusted as shown they enter and leave the water approximately on edge, and thus waste little or no power in entering the water and raise little or no water in leaving it. With this construction of wheel, therefore, I am able to utilize far more of the engine-power in propelling the boat than with any other construction of wheel. It will also be noticed that the blades of the wheels are set so that as the wheel is rotated the water will be thrown toward the sides of the boat. In order, therefore, to utilize the force of the water to aid in the propulsion of the boat, I form a recess N in the hull of the boat, commencing at a point a little in front of the paddle-wheel shaft and curving inward and rearward, as shown in dotted lines *f f* in Figs. 6 and 9. In the side-wheel construction of Figs. 1 and 2 this recess is in depth about the width of the paddle-wheel, while in the stern-wheel canal-boat construction of Figs. 7, 8, 9, and 10 the curve extends inward to the keel of the boat. This curved portion P opposite the paddle-wheel I call the "propelling-board." The water is thrown inward by the rotation of the wheel and is forced against this curved surface, the tendency, of course, being to push the boat forward. In addition to this the water by the angle of the paddle-wheel blades is taken from the sides and, as it were, wedged into the recess, and the tendency is to force the boat forward by a sort of a wedging process. At the same time the vacant spaces which would ordinarily be left by the rapid advance of the boat are kept filled with the water forced in from the sides. The paddle-wheels can therefore be driven at a very high speed, and there is little or no tendency to "swamp" the wheel. With the ordinary paddle-wheel construction as soon as a certain speed is attained for any increase of speed of the wheel such a volume of water is carried over by the wheel in front and driven away from the rear that the result is only a churning of the water without any increase in speed, and the entire power of the engine is taken up in driving the wheels. The same result is experienced with screw-propellers. After a certain speed is reached in the rotation of the screw the only result is a churning of the water and the speed of the boat decreases accordingly. Moreover, with screw-propellers the water is driven away from the stern, the prow of the boat rises, and the effect is the same as forcing the boat uphill. With my construction, however, the water is forced in under the stern of the boat, the tendency is to raise the stern, and the boat, as it were, slides downhill instead of having to be forced uphill. It will be seen, therefore, with my two features of novelty working together a construction is arrived at by which great speed and power may be developed far in excess of any speed heretofore attained. In the construction of boat illustrated in Figs. 1 and 6 it is not essential that the recess N should be curved back to the stern of the boat, as shown by the dotted lines *f f*. The recess can end as shown by the dotted lines *g g*.

In the canal-boat R (shown in Figs. 7, 8, 9, and 10) the paddle-wheels S S may be set within the side lines of the boat, as shown in Figs. 9 and 10, or they may be placed at the sides, as shown in Figs. 7 and 8. When set within the side lines, the portion of the hull in front of the wheels is cut away, as shown at T and by dotted lines *l l* in Fig. 9, so as to prevent too much suction and to allow the wheels free access to the water.

In the canal-boat construction it will be noticed that a partition U is left to the rear of the curved portion or propelling-surface, and that the rudder V is secured at the end of this partition. This partition U does not aid in the propulsion of the boat directly; but it serves to keep separated the two streams of water thrown in by the wheels and prevents the formation of eddies and any suction of the water at that point, and thus there is very much less disturbance of the water than there would be if the partition were omitted. The paddle-wheels can also be placed at the extreme end of the boat and the propelling-surface obtained by building out the hull at the stern to form curved surfaces for the water to strike against.

The essential features of the recesses employed in connection with the wheels in all the constructions shown, it will be understood, is the curved surface which commences about the middle of the paddle-wheels and is curved away from the wheels so as to give an inclined surface for the water to strike against.

In the construction of canal-boat shown in Figs. 9 and 10 in addition to placing the wheels within the side lines of the boat I run the fenders A' along the sides of the boat and outside the wheels. In this way there is no danger to the paddle-wheels as the boat enters or leaves the locks, and the boat may be made the full width permissible within the limits of the widths of the locks through which it will have to pass.

Having thus described my invention, what I claim, and desire to secure by Letters Patent, is—

1. In a boat, the combination with a wheel-shaft at right angles to the boat, and a drum secured thereto, of spirally-curved paddle-blades secured across the drum, and provided with external flanges concentric to the drum, said blades being secured in such a way that the directrix of the curvature of the blades is at right angles to the axis of the wheel-shaft, substantially as described.

2. In a boat, the combination with a wheel-shaft at right angles to the boat, and a drum secured thereto, of spirally-curved blades secured across the drum and provided with external flanges concentric thereto, and with a rim at each external edge to bind the blades together, said blades being secured in such a way that the directrix of the curvature of the blades is at right angles to the axis of the wheel-shaft substantially as described.

3. In a boat, the combination, with a shaft at right angles to the boat, and a paddle-wheel, having blades secured at an angle to the center line of the supporting-shaft, of the hull of the boat provided with a propelling-surface curved inward and rearward to receive the water thrown against same by the wheels, substantially as shown and described.

4. In a boat, the combination, with a shaft at right angles to the boat, and a paddle-wheel, provided with paddle-blades bent to form a constantly-increasing angle to the center line of the supporting-shaft, and all the radial lines of which are straight and lie in planes parallel to each other and at right angles to the shaft, of the hull of the boat, provided with a propelling-surface curved inward and rearward to receive the water thrown against same by the wheel, substantially as shown and described.

5. In a boat, the combination, with a wheel-shaft at right angles to the boat and drum secured thereto, provided with paddle-blades secured across the drum at an angle to the center line of the shaft, said blades being bent to form a constantly-increasing angle thereto, and all the radial lines of which are straight and lie in planes parallel to each other and at right angles to the shaft, of the hull of the boat, provided with a propelling-surface curved inward and rearward to receive the water thrown against same by the wheel, substantially as shown and described.

6. In a canal-boat, the combination, with paddle-wheels having blades secured at an angle to the center line of the supporting-shaft, of the hull cut away at the stern to receive the paddle-wheels within the side lines of the boat, and provided with propelling-surfaces curved inward and rearward to receive the water thrown against same by the wheels, substantially as shown and described.

7. In a canal-boat, the combination, with paddle-wheels having blades secured at an angle to the center line of the supporting-shaft, of the hull of the boat cut away at the stern to receive the paddle-wheels within the side lines of the boat, and in front of the wheels to prevent suction of the water, and provided with propelling-surfaces curved away from and rearward of the paddle-wheels, with a fender along the sides of the boat and outside the wheels, substantially as shown and described.

GEORGE W. C. LOMB.

Witnesses:
  N. G. EDWARDS,
  GEORGE HEIDMAN.